United States Patent [19]
Seelandt et al.

[11] 3,749,805
[45] July 31, 1973

[54] FLUID BED FURNACE

[75] Inventors: Karl H. Seelandt, Contoocook, N.H.; Hobart L. Wentworth, Barrington, Ill.

[73] Assignee: Sola Basic Industries, Inc., Milwaukee, Wis.

[22] Filed: Nov. 26, 1971

[21] Appl. No.: 202,269

[52] U.S. Cl................. 13/20, 219/359, 219/369, 219/381, 219/407
[51] Int. Cl..................... F27b 15/00, H05b 3/60
[58] Field of Search.............. 219/359, 360, 365, 219/367, 369, 370, 374, 399, 400, 381, 390, 406, 407, 50; 13/20, 22, 25

[56] References Cited
UNITED STATES PATENTS 2,784,243   3/1957   McAllister et al...................... 13/20
3,025,385   3/1962   Tanaka.............................. 13/20 X Primary Examiner—Roy N. Envall, Jr.
Attorney—D. Verner Smythe et al.

[57] ABSTRACT

A fluid bed furnace has an electric heating coil mounted on the outer face of a guard element frame which is positioned within the shell of the furnace so as to be immersed in the granular material comprising the fluid bed material. The guard element frame and heating coil comprise an assembly which can be removed as a unit from the furnace. A seal is provided on the outer face of the bottom edge of the shell to prevent entry of granular material into the layer of insulation on the outside of the shell.

11 Claims, 4 Drawing Figures

AIR IN

INVENTORS
KARL H. SEELANDT
HOBART L. WENTWORTH
BY
ATTORNEYS

FLUID BED FURNACE

This invention relates to fluid bed industrial furnaces, or one wherein air or gas is blown up through a bed of heated material.

A fluid bed industrial furnace has a bed of granular material through which a fluid is directed upwardly therethrough in order to fluidize the bed. A suitable heating element, which can be electrical in nature, is mounted within the fluid bed to heat the bed. The material which is to be subjected to the action of the furnace is generally positioned in a work basket which may be then immersed in the heated fluid bed. The uniformity of heat transfer within the fluid bed subjects all portions of the workpiece to substantially uniform thermal action.

Such fluid bed furnaces have generally been electrically heated and the heating elements have not been positioned directly in the fluid bed in order to take advantage of the high heat transfer characteristics of the ordinary bed. The fluidized medium was contained in a vessel having metallic sides outside of which the heating elements were located. Prior fluid bed furnaces have had difficulties in the maintenance thereof. When it is desired to inspect or repair the heating elements, it was first necessary to remove all of the granular material of the bed from the furnace as well as the containing metallic member so as to expose the heating elements. This not only required considerable time on the part of skilled personnel, but invariably resulted in difficulties in removing the granular material and shell and then subsequently in replacing the material and shell. Further, handling of the material caused the granular material to seep between the bottom edge of the shell and the porous diffusion bottom so that the granular material entered into the insulation material positioned on the outer face of the shell. This also added to maintenance problems since it was necessary to replace the insulation because the penetration of the insulation by the granular material significantly decreased its insulating properties. Also, in normal operation, the fine bed material would find its way into the insulation.

One of the objects of the present invention is to provide an improved fluid bed furnace construction.

Another of the objects of the present invention is to provide a fluid bed furnace from which the heating element can be disassembled therefrom without removing the fluid bed or its container.

Another of the objects of the invention is to provide an effective seal between the insulation on the outer face of the shell and the granular material on the inside of the shell.

According to one aspect of the present invention, a fluid bed industrial furnace may comprise an insulated shell having a porous diffusion bottom member. A bed of granular material is contained within the shell upon the diffusion member. Means are provided for flowing a fluid upwardly through the bed of granular material to fluidize the material. Element guard means are removably mounted within the shell and immersed in the bed of granular material, with the guard means being spaced inwardly from said shell. Heating element means are mounted on the outer face of the element guard means and spaced inwardly of the shell so that the entire assembly of the element guard means and the heating element means can be removed from the fluidized bed of the furnace as a unit.

The shell is provided with a blanket of insulation on its outer face. Sealing means are secured at the bottom of the shell for sealing against the entry of granular material under the bottom edge of the shell into the insulation means.

The shell may be a cylinder or may have a rectangular cross section with the guard element means having a shape similar to that of the shell but slightly smaller so as to fit therein.

Other objects, advantages and features of the invention will become apparent from the accompanying description and drawings, which are merely exemplary.

In the drawings.

Preceeding next to the drawings wherein like reference symbols indicate the same parts throughout the various views, a specific embodiment of the present invention will be described in detail.

Figure 1:
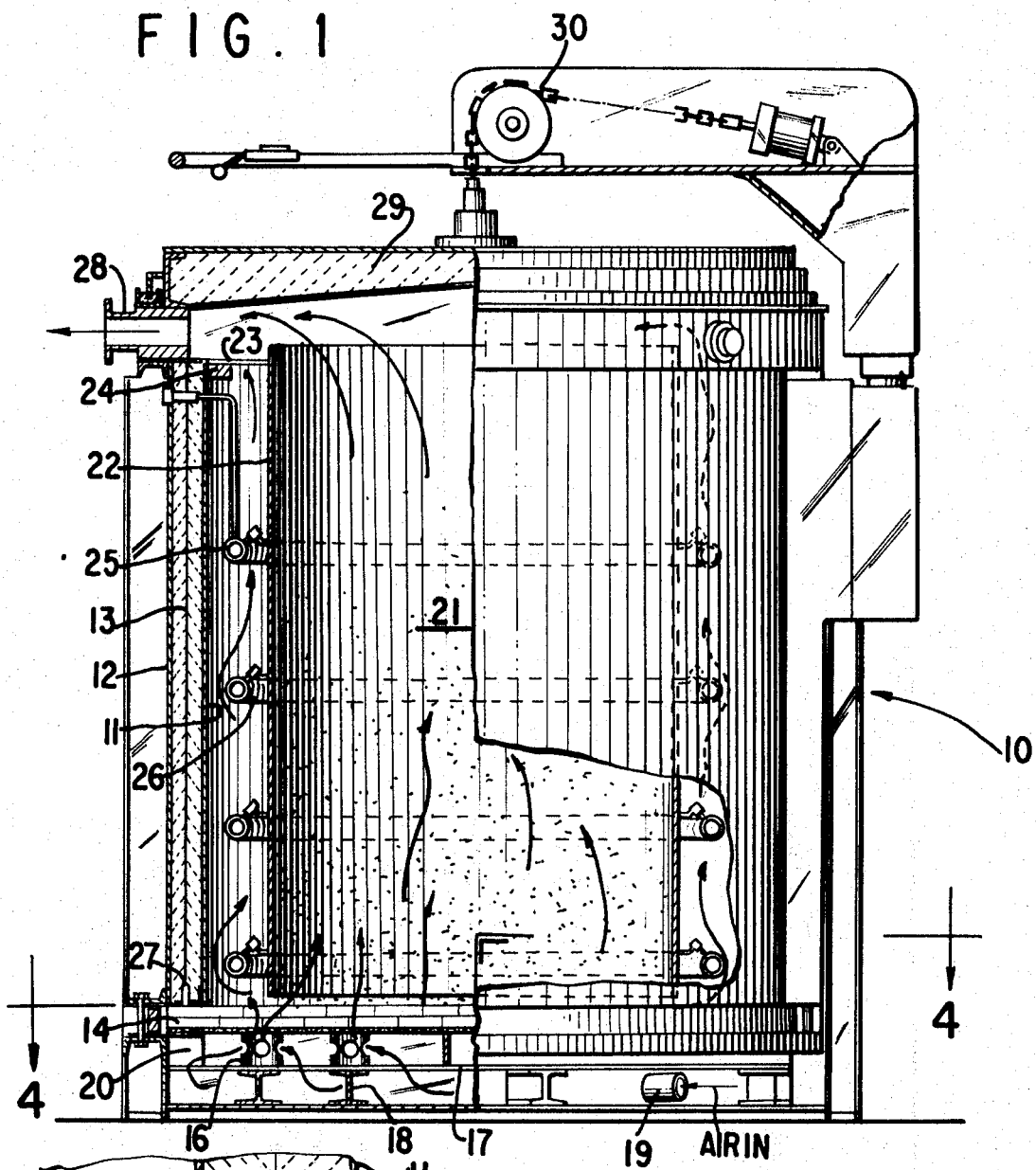
FIG. 1 is an elevational view of the fluid bed furnace according to the present invention with a portion of the furnace being shown in section taken along line 1—1 of FIG. 2.

FIG. 1 illustrates generally at 10 a fluid bed industrial furnace according to the present invention. The furnace 10 comprises main shell 11 fabricated of heat resistant metal or alloy and provided with special heat resistant bottom flanges to absorb thermal expansion. A layer of insulation 13, which may comprise a suitable insulation blanket, is positioned outside shell 11. An outer shell or perforated container 12 is used only to contain the insulation.

The shells are positioned upon bottom diffusion member 14 which comprises a double layer of porous refractory material arranged with staggered vertical joints. The diffusion member 14 is supported by a perforated plate 15 which in turn is supported on ventilated piers 16 on plenum bottom plate 17. The entire furnace assembly may be positioned upon supporting legs, comprising a plurality of I beams 18 supporting plate 17.

A fluid, which may be air or other suitable gas, is introduced through air inlet 19 from a suitable supply, such as the action of a turbo-blower (not shown).

Within the shell 11 there is located a fluid bed 21, which is a mass of non-agglomerative, granular material, through which a sufficient upward flow of fluid maintains a condition analogous to that of a fluid. The bed may comprise silica sand or granular particles of alumina, silicon carbide or other refractory materials.

A cylindrical guard element frame 22 which is somewhat smaller in diameter than the diameter of cylindrical shell 11 is positioned within the shell 11 by means of external flange 23 which rests upon annular ledge 24 mounted on the inner face of the shell 11. The guard 22 is immersed in the fluid bed 21 and has an electric helical coil 25 mounted by means of ceramic insulators 26 on the outer face of guard frame 22. The guard frame 22 and heating elements 25 form an assembly which can be lifted out of the fluid bed as a unit for maintenance, inspection or repair.

Figure 3:
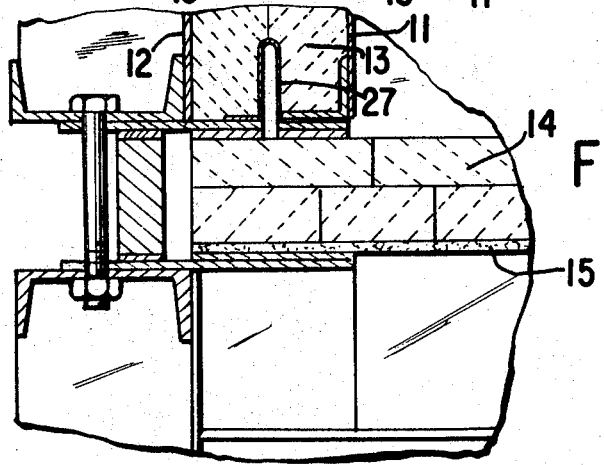
FIG. 3 is a sectional view which is in enlarged scale of the sealing element between the outer shell and the diffusion bottom.
Figure 2:
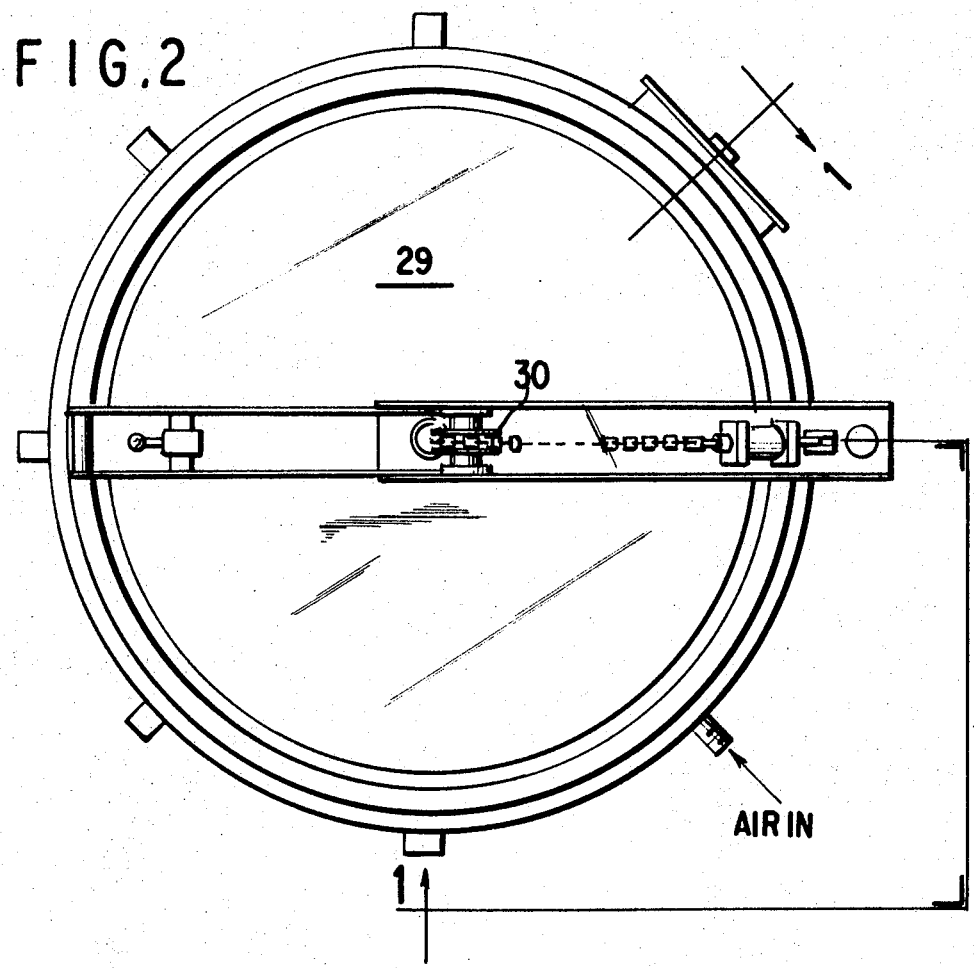
FIG. 2 is a top plan view of the furnace as illustrated in FIG. 1.
Figure 4:
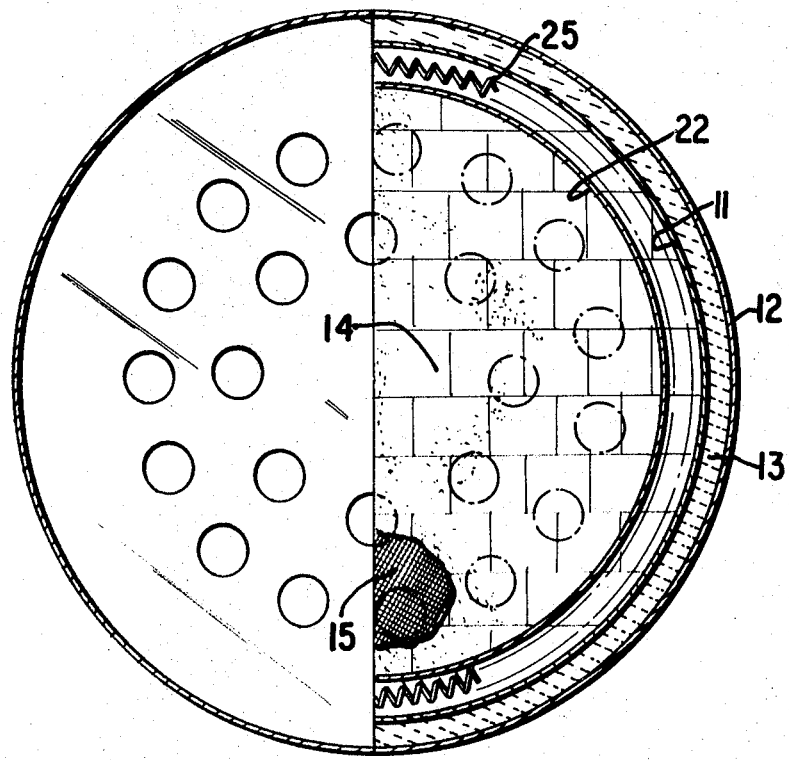
FIG. 4 is a sectional view taken along the line 4—4 of FIG. 1, the right half being at a higher level than the left half.

On the outer face of the shell 11, adjacent the bottom edge, there is positioned an annular seal 27 which may be secured to the supporting frame of the furnace as shown in FIG. 3. Seal 27 is resilient and may be provided with a plurality of corrugations so as to bear against the outer surface of the diffusion member 14 to prevent the sand or material of the fluid bed from seeping between the edge of shell 11 and the diffusion bottom 14 into insulation 13.

The annular ledge 24 also forms a support for a spider which extends across the fluid bed from which a heat resistant metal work basket is suspended so as to be immersed into the fluid bed. The work baskets, which are not shown in the drawings, have perforated or open sides and bottom so that the fluidized bed material can circulate through the basket and around the workpiece contained therein.

The air flowing upwardly through the fluid bed 21 is exhausted through duct 28 and may be then conducted into a smoke abater as described in copending application Ser. No. 202,223 filed Nov. 26, 1971.

The furnace is closed at its upper end by an insulated cover 29 which is removable by means of a hoist or opening mechanism 30. The fluid bed furnace may be be constructed as a pit type or as a bench type suitable for use in relatively small scale operations.

While the fluid bed furnace of the present invention has been disclosed as being cylindrical in shape, the present invention may also be incorporated in a rectangular furnace, including a furnace having a slot in the cover through which a work basket may be supported from a monorail chain conveyor belt with the work basket being movable through the fluid bed.

In operation, air under suitable pressure is introduced through the air inlet orifice into the plenum chamber. As the air in the plenum chamber increases in pressure, the air will be diffused upwardly through the diffusion member so as to cause the entire fluid bed to fluff slightly and then settle back to a state resembling a boiling liquid. Upon decreasing the air pressure, the boiling action will decrease gradually to a completely quiescence state. If the air pressure is increased, the boiling action will become increasingly violent and gradually become geyser-like in appearance. Concurrently with the fluidizing of the bed, the heating elements will be energized so as to heat the bed to temperatures in the range of 200° – 1,500°F. or above, depending upon the material of the bed, the heating unit, and the process to be carried out. The heat is then uniformly diffused throughout the bed and against the workpiece or workpieces positioned therein in a work basket suspended from a spider positioned within the furnace.

The fluid bed furnace of the present invention can be used for many purposes, especially where a high rate of heat transfer is desirable. One example is heating of aluminum which is a high reflector. Another use would be for removing polymers from dies, screens, piping and similar purposes. Still another use is for burning insulation off of copper or conductors in electrical machinery so as to recover the scrap metal. In heat treating of metal, uniformity is attainable. Also, it would be possible to replace the electrical heating elements with cooling coils (not shown) where it is desired to cool the articles.

It is to be understood that changes in various details of construction and arrangement of parts may be made without departing from the spirit of the invention except as defined in the appended claims.

What is claimed is:

1. In a fluid bed industrial furnace, the combination of a shell having a porous diffusion bottom member, a fluidizable bed of granular material within said shell on said diffusion member, means for directing fluid upwardly through said bed of granular material to fluidize the granular material, element guard means removably supported within said shell and immersed in said bed of granular material, said guard means being spaced inwardly of said shell, and electric heating element means in said bed of granular material mounted on the outer face of said element guard means and spaced inwardly from the inner face of said shell, whereby the entire assembly of the element guard means and heating element means can be removed as a unit from the fluidizable bed of the furnace.

2. In a fluid bed industrial furnace as claimed in claim 1 wherein said heating element means comprises a helical coil.

3. In a fluid bed industrial furnace as claimed in claim 2 and including ceramic insulator means mounting said coil on said guard element means.

4. In a fluidic bed industrial furnace as claimed in claim 1 and including means on the inner face of said shell for defining a ledge upon which said element guard means is supported.

5. In a fluid bed industrial furnace as claimed in claim 4 and including external flange means on the upper end of said guard element means and positionable on said ledge means.

6. In a fluid bed industrial furnace as claimed in claim 1 wherein said shell includes a cylinder and said guard element means comprises a cylindrical frame of smaller diameter so as to fit within said shell.

7. In a fluid bed industrial furnace as claimed in claim 1 wherein said shell has a rectangular cross section, the cross section of said guard element means being similar to that of said shell but being smaller so as to fit therein.

8. In a fluid bed industrial furnace as claimed in claim 1 wherein said shell has an insulation means on the outer face thereof, and means at the bottom of said shell for sealing against the entry of granular material under the bottom edge of said shell into said insulation means.

9. In a fluid bed industrial furnace as claimed in claim 8 wherein sealing means is secured under the bottom edge of said shell against the top edge of said porous diffusion member.

10. In a fluid bed industrial furnace as claimed in claim 9 wherein said sealing means comprises a resilient annular corrugated member bearing against the lower portion of said shell to prevent the entry of granular material into said insulating means.

11. In a fluid bed industrial furnace as claimed in claim 9 wherein a sealing means bears against the underside of the porous diffusion member and the top periphery of the air plenum beneath.

* * * * *